United States Patent
Wang et al.

(10) Patent No.: US 10,817,097 B2
(45) Date of Patent: Oct. 27, 2020

(54) TERMINAL

(71) Applicant: Huawei Technologies Co., Ltd., Shenzhen (CN)

(72) Inventors: Chingyi Wang, Shenzhen (CN); Xiaoyan Yu, Shenzhen (CN); Junyong Zhang, Shenzhen (CN); Yang Zou, Shenzhen (CN); Ren Lv, Shanghai (CN); Jianpeng Li, Shenzhen (CN); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/562,536

(22) PCT Filed: Aug. 25, 2015

(86) PCT No.: PCT/CN2015/088009
§ 371 (c)(1),
(2) Date: Sep. 28, 2017

(87) PCT Pub. No.: WO2017/031687
PCT Pub. Date: Mar. 2, 2017

(65) Prior Publication Data
US 2018/0113554 A1    Apr. 26, 2018

(51) Int. Cl.
G06F 3/041 (2006.01)
G02F 1/1333 (2006.01)
G06F 3/044 (2006.01)

(52) U.S. Cl.
CPC ........ G06F 3/0414 (2013.01); G02F 1/13338 (2013.01); G06F 3/041 (2013.01);
(Continued)

(58) Field of Classification Search
CPC .................. G06F 3/0414; G06F 3/041–048
See application file for complete search history.

(56) References Cited

U.S. PATENT DOCUMENTS 7,538,831 B2 * 5/2009 Nakanishi ............. G06F 3/0412
345/104
2004/0027761 A1 * 2/2004 Fukui ..................... G06F 3/041
361/100
(Continued)

FOREIGN PATENT DOCUMENTS

CN    102105852 A    6/2011
CN    103823592 A    5/2014
(Continued)

OTHER PUBLICATIONS

Machine Translation and Abstract of Chinese Publication No. CN103823592, May 28, 2014, 26 pages.
(Continued)

Primary Examiner — Hang Lin
(74) Attorney, Agent, or Firm — Conley Rose, P.C.

(57) ABSTRACT

A terminal includes a cover, a display module, and a metal middle frame. The display module is located between the cover and the metal middle frame, and the metal middle frame is grounded. The terminal further includes a conducting layer, where the conducting layer is attached to a lower surface of the display module, and at least one gap exists between the conducting layer and the metal middle frame. The conducting layer, the metal middle frame, and the at least one gap form at least one capacitor, where a capacitance change of the at least one capacitor reflects a magnitude of at least one pressure acted on the cover.

5 Claims, 9 Drawing Sheets

(52) U.S. Cl.
CPC .... *G06F 3/044* (2013.01); *G06F 2203/04103* (2013.01); *G06F 2203/04106* (2013.01)

(56) References Cited

U.S. PATENT DOCUMENTS

| | | | |
|---|---|---|---|
| 2010/0024573 A1 | 2/2010 | Daverman et al. | |
| 2010/0156810 A1* | 6/2010 | Barbier | G06F 3/044 345/173 |
| 2013/0021544 A1* | 1/2013 | Fukuyama | G02F 1/13338 349/12 |
| 2013/0185074 A1 | 7/2013 | Gruber et al. | |
| 2014/0001023 A1* | 1/2014 | Guard | G06F 3/044 200/600 |
| 2014/0176485 A1* | 6/2014 | Holmberg | G06F 3/041 345/174 |
| 2014/0192007 A1* | 7/2014 | Westhues | G06F 3/044 345/174 |
| 2015/0070306 A1 | 3/2015 | Shinkai et al. | |
| 2015/0153942 A1 | 6/2015 | Kim et al. | |
| 2015/0193056 A1 | 7/2015 | Bolender et al. | |
| 2017/0146851 A1 | 5/2017 | Shi | |

FOREIGN PATENT DOCUMENTS

| | | |
|---|---|---|
| CN | 104698634 A | 6/2015 |
| CN | 104834419 A | 8/2015 |
| JP | 2003022729 A | 1/2003 |
| JP | 2013008231 A | 1/2013 |
| JP | 2013142613 A | 7/2013 |
| JP | 2014109991 A | 6/2014 |
| JP | 2015056005 A | 3/2015 |
| KR | 20110022727 A | 3/2011 |
| WO | 2010115131 A2 | 10/2010 |
| WO | 2011122352 A1 | 10/2011 |
| WO | 2014092758 A1 | 6/2014 |

OTHER PUBLICATIONS

Machine Translation and Abstract of Japanese Publication No. JP2014109991, Jun. 12, 2014, 18 pages.
Foreign Communication From a Counterpart Application, PCT Application No. PCT/CN2015/088009, English Translation of International Search Report dated May 20, 2016, 3 pages.
Foreign Communication From a Counterpart Application, European Application No. 15901958.7, Extended European Search Report dated Mar. 20, 2018, 9 pages.
Foreign Communication From a Counterpart Application, Korean Application No. 10-2017-7030000, Korean Office Action dated Jan. 10, 2019, 9 pages.
Foreign Communication From a Counterpart Application, Korean Application No. 10-2017-7030000, English Translation of Korean Office Action dated Jan. 23, 2019, 10 pages.
Machine Translation and Abstract of Japanese Publication No. JP2013008231, Jan. 10, 2013, 34 pages.
Machine Translation and Abstract of Japanese Publication No. JP2013142613, Jul. 22, 2013, 51 pages.
Foreign Communication From a Counterpart Application, Japanese Application No. 2017-557078, Japanese Office Action dated Dec. 17, 2018, 4 pages.
Foreign Communication From a Counterpart Application, Japanese Application No. 2017-557078, English Translation of Japanese Office Action dated Dec. 17, 2018, 3 pages.
Machine Translation and Abstract of Chinese Publication No. CN102105852, Jun. 22, 2011, 16 pages.
Foreign Communication From a Counterpart Application, Chinese Application No. 201580028660.3, Chinese Office Action dated Aug. 8, 2019, 12 pages.

* cited by examiner

TERMINAL

CROSS-REFERENCE TO RELATED APPLICATION

This application is a national stage of International Application No. PCT/CN2015/088009, filed on Aug. 25, 2015, which is hereby incorporated by reference in its entirety.

TECHNICAL FIELD

The present invention relates to the terminal field, and specifically, to a terminal.

BACKGROUND

As a human-computer interaction module, a touchscreen is more widely applied to and becomes more significant in electronic devices such as a mobile phone, an iPad, and a personal computer (PC), and a higher requirement is imposed on a human-computer interaction visual feeling of the touchscreen. For example, pressure touch control is implemented by using pressure sensing.

Currently, a structure of pressure materials needed for pressure sensing is a sandwich structure, and the pressure materials are integrated on a pressure sensor. Therefore, independent and dedicated pressure sensors are arranged in four corners below a liquid crystal display (LCD).

However, the pressure materials are dedicated pressure materials, and material costs are high. In addition, a new provider needs to be developed for resource integration, and integration costs are high.

SUMMARY

Embodiments of the present invention disclose a pressure sensing method and a terminal, so as to resolve a problem in the prior art that costs for implementing pressure touch control are high, and to reduce the costs.

A first aspect of the present invention provides a terminal, where the terminal includes a cover, a display module, and a metal middle frame, the display module is located between the cover and the metal middle frame, and the metal middle frame is grounded; and the terminal further includes:

a conducting layer, where the conducting layer is attached to a lower surface of the display module; and at least one gap exists between the conducting layer and the metal middle frame, and the conducting layer, the metal middle frame, and the at least one gap form at least one capacitor, where a capacitance change of the at least one capacitor reflects a magnitude of at least one pressure acted on the cover.

With reference to the first aspect, in a first possible implementation, the conducting layer includes at least a first conducting block and a second conducting block, and the first conducting block is connected to the second conducting block;

the first conducting block and the second conducting block each are attached to the lower surface of the display module; and a first gap exists between the first conducting block and the metal middle frame, and the first conducting block, the metal middle frame, and the first gap form a first capacitor; and a second gap exists between the second conducting block and the metal middle frame, and the second conducting block, the metal middle frame, and the second gap form a second capacitor, where capacitance changes of the first capacitor and the second capacitor reflect a magnitude of a first pressure acted on the cover.

With reference to the first aspect, in a second possible implementation, the conducting layer includes at least a third conducting block and a fourth conducting block, and the third conducting block is not connected to the fourth conducting block;

the third conducting block and the fourth conducting block each are attached to the lower surface of the display module;

a third gap exists between the third conducting block and the metal middle frame, and the third conducting block, the metal middle frame, and the third gap form a third capacitor, where a capacitance change of the third capacitor reflects a magnitude of a second pressure acted on the cover; and a fourth gap exists between the fourth conducting block and the metal middle frame, and the fourth conducting block, the metal middle frame, and the fourth gap form a fourth capacitor, where a capacitance change of the fourth capacitor reflects a magnitude of a third pressure acted on the cover.

With reference to the first possible implementation of the first aspect, in a third possible implementation, the first conducting block is attached to the lower surface of the display module by using sealant or a whole surface of adhesive, or the second conducting block is attached to the lower surface of the display module by using sealant or a whole surface of adhesive, where an attaching area of the first conducting block and an attaching area of the second conducting block do not overlap.

With reference to the second possible implementation of the first aspect, in a fourth possible implementation, the third conducting block is attached to the lower surface of the display module by using sealant or a whole surface of adhesive, or the fourth conducting block is attached to the lower surface of the display module by using sealant or a whole surface of adhesive, where an attaching area of the third conducting block and an attaching area of the fourth conducting block do not overlap.

With reference to any one of the first aspect or the first to the fourth possible implementations of the first aspect, in a fifth possible implementation, at least one elastic adhesive is adhered to a lower surface of the conducting layer or an upper surface of the metal middle frame.

With reference to any one of the first aspect or the first to the fifth possible implementations of the first aspect, in a sixth possible implementation, a material of the conducting layer is an indium tin oxide (ITO) film or a copper foil flexible printed circuit (FPC).

A second aspect of the present disclosure provides a terminal, where the terminal includes a cover, a display module, and a metal middle frame, the display module is located between the cover and the metal middle frame, and the metal middle frame is grounded; and the terminal further includes:

a conducting layer, where the conducting layer is attached to an upper surface of the metal middle frame by using at least one elastic adhesive, the at least one elastic adhesive is non-conductive, and the conducting layer, the metal middle frame, and the at least one elastic adhesive form at least one capacitor, where a capacitance change of the at least one capacitor reflects a magnitude of at least one pressure acted on the cover.

With reference to the second aspect, in a first possible implementation, the conducting layer includes at least a first conducting block and a second conducting block, and the first conducting block is connected to the second conducting block;

the first conducting block is attached to an upper surface of a first elastic adhesive, and the first conducting block, the metal middle frame, and the first elastic adhesive form a first capacitor; and the second conducting block is attached to an upper surface of a second elastic adhesive, and the second conducting block, the metal middle frame, and the second elastic adhesive form a second capacitor, where capacitance changes of the first capacitor and the second capacitor reflect a magnitude of a first pressure acted on the cover.

With reference to the second aspect, in a second possible implementation, the conducting layer includes at least a third conducting block and a fourth conducting block, and the third conducting block is not connected to the fourth conducting block;

the third conducting block is attached to an upper surface of a third elastic adhesive, and the third conducting block, the metal middle frame, and the third elastic adhesive form a third capacitor, where a capacitance change of the third capacitor reflects a magnitude of a second pressure acted on the cover; and the fourth conducting block is attached to an upper surface of a fourth elastic adhesive, and the fourth conducting block, the metal middle frame, and the fourth elastic adhesive form a fourth capacitor, where a capacitance change of the fourth capacitor reflects a magnitude of a third pressure acted on the cover.

With reference to the second aspect or the first and second possible implementations of the second aspect, in a third possible implementation, a material of the conducting layer is an ITO film or a copper foil FPC.

A third aspect of the present disclosure provides a terminal, where the terminal includes a cover and a display module, where the cover is located above the display module, the display module includes a backlight unit, a thin film transistor (TFT) substrate and a TFT circuit, the TFT substrate is located between the backlight unit and the TFT circuit, and the TFT circuit includes a constant voltage layer; and the terminal further includes:

a conducting layer, where the conducting layer is attached to a lower surface of the backlight unit; and a dielectric exists between the conducting layer and the constant voltage layer of the TFT circuit, and the conducting layer, the constant voltage layer of the TFT circuit, and the dielectric form at least one capacitor, where a capacitance change of the at least one capacitor reflects a magnitude of at least one pressure acted on the cover, and the dielectric includes the TFT substrate.

With reference to the third aspect, in a first possible implementation, the conducting layer includes at least a first conducting block and a second conducting block, and the first conducting block is connected to the second conducting block;

the first conducting block and the second conducting block each are attached to the lower surface of the backlight unit; and a first dielectric exists between the first conducting block and the constant voltage layer of the TFT circuit, and the first conducting block, the constant voltage layer of the TFT circuit, and the first dielectric form a first capacitor; and a second dielectric exists between the second conducting block and the constant voltage layer of the TFT circuit, and the second conducting block, the constant voltage layer of the TFT circuit, and the second dielectric form a second capacitor, where capacitance changes of the first capacitor and the second capacitor reflect a magnitude of a first pressure acted on the cover.

With reference to the third aspect, in a second possible implementation, the conducting layer includes at least a third conducting block and a fourth conducting block, and the third conducting block is not connected to the fourth conducting block;

the third conducting block and the fourth conducting block each are attached to the lower surface of the backlight unit;

a third dielectric exists between the third conducting block and the constant voltage layer of the TFT circuit, and the third conducting block, the constant voltage layer of the TFT circuit, and the third dielectric form a third capacitor, where a capacitance change of the third capacitor reflects a magnitude of a second pressure acted on the cover; and a fourth dielectric exists between the fourth conducting block and the constant voltage layer of the TFT circuit, and the fourth conducting block, the constant voltage layer of the TFT circuit, and the fourth dielectric form a fourth capacitor, where a capacitance change of the fourth capacitor reflects a magnitude of a third pressure acted on the cover.

With reference to any one of the third aspect or the first and the second possible implementations of the third aspect, in a third possible implementation, the terminal further includes:

a metal middle frame, where the metal middle frame is located below the conducting layer; and at least one elastic adhesive is adhered to a lower surface of the conducting layer or an upper surface of the metal middle frame.

With reference to any one of the second aspect or the first to the third possible implementations of the second aspect, in a fourth possible implementation, a material of the conducting layer is an ITO film or a copper foil FPC.

A fourth aspect of the present disclosure provides a terminal, where the terminal includes a cover, a display module, and a middle frame, and the display module is located between the cover and the middle frame; and the terminal further includes:

a conducting layer, where the conducting layer is attached to an upper surface of the middle frame; and at least one gap exists between the conducting layer and a lower surface of the display module, the lower surface of the display module is a metal material, the lower surface of the display module is grounded, and the conducting layer, the lower surface of the display module, and the at least one gap form at least one capacitor, where a change of the at least one capacitor reflects a magnitude of at least one pressure acted on the cover.

With reference to the fourth aspect, in a first possible implementation, the conducting layer includes at least a first conducting block and a second conducting block, and the first conducting block is connected to the second conducting block;

the first conducting block and the second conducting block each are attached to the upper surface of the middle frame; and a first gap exists between the first conducting block and the lower surface of the display module, and the first conducting block, the lower surface of the display module, and the first gap form a first capacitor; and a second gap exists between the second conducting block and the lower surface of the display module, and the second conducting block, the lower surface of the display module, and the second gap form a second capacitor, where capacitance changes of the first capacitor and the second capacitor reflect a magnitude of a first pressure acted on the cover.

With reference to the fourth aspect, in a second possible implementation, the conducting layer includes at least a third conducting block and a fourth conducting block, and the third conducting block is not connected to the fourth conducting block;

the third conducting block and the fourth conducting block each are attached to the upper surface of the middle frame;

a third gap exists between the third conducting block and the lower surface of the display module, and the third conducting block, the lower surface of the display module, and the third gap form a third capacitor, where a capacitance change of the third capacitor reflects a magnitude of a second pressure acted on the cover; and a fourth gap exists between the fourth conducting block and the lower surface of the display module, and the fourth conducting block, the lower surface of the display module, and the fourth gap form a fourth capacitor, where a capacitance change of the fourth capacitor reflects a magnitude of a third pressure acted on the cover.

With reference to the fourth aspect or the first and the second possible implementations of the fourth aspect, in a third possible implementation, a material of the conducting layer is an ITO film or a copper foil FPC.

According to the foregoing technical solutions, a terminal includes a cover, a display module, and a metal middle frame, where the display module is located between the cover and the metal middle frame, and the metal middle frame is grounded. The terminal further includes a conducting layer, where the conducting layer is attached to a lower surface of the display module, and at least one gap exists between the conducting layer and the metal middle frame. The conducting layer, the metal middle frame, and the at least one gap form at least one capacitor, where a capacitance change of the at least one capacitor reflects a magnitude of at least one pressure acted on the cover. It can be learned that the conducting layer only needs to be a conducting material. Therefore, pressure touch control may be implemented by using a large quantity of existing conducting materials instead of dedicated pressure materials, thereby reducing material costs to a great extent. Further, the at least one capacitor is formed by using the conducting layer, the metal middle frame, and the at least one gap, and a magnitude of a pressure acted on the cover is reflected by the capacitance change of the capacitor, thereby implementing the pressure touch control. Different from the prior art, a conducting material needed for the conducting layer is in existence, and no dedicated pressure material is needed. Therefore, the pressure touch control may be implemented without a need of developing a new provider for resource integration, thereby reducing integration costs.

DESCRIPTION OF EMBODIMENTS

Embodiments of the present disclosure disclose a terminal, so as to resolve a problem in the prior art that costs for implementing pressure touch control are high, and to reduce the costs.

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Technical solutions in the present disclosure are applicable to any terminal, such as a smartphone, an iPad, and a personal computer. This is not limited herein.

Figure 1:
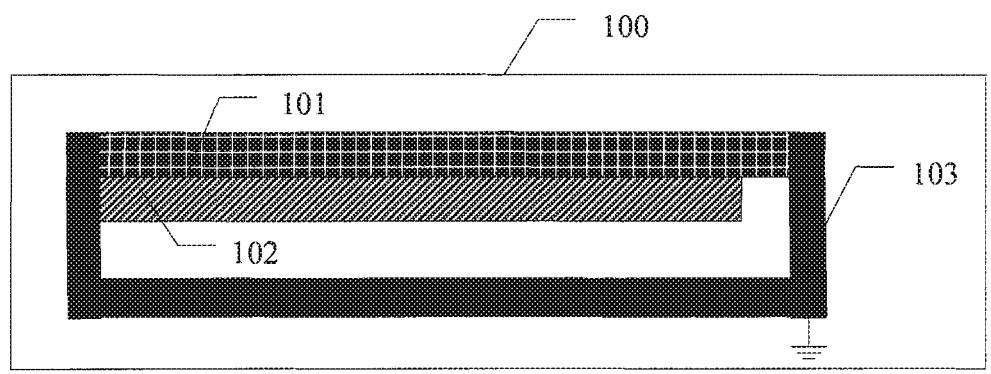
FIG. 1 is a schematic structural diagram of a terminal in the prior art.

The terminal may be a terminal with a touchscreen, or may be a terminal with a key or button, and no specific limitation is imposed herein. As shown in FIG. 1, a general structure of the terminal is further described.

A terminal 100 includes a cover 101, a display module 102 below the cover 101, and a metal middle frame 103 below the display module 102, where the cover 101 and the display module 102 may be bonded by using an optical clear adhesive (OCA), and the metal middle frame 103 is grounded. Specifically, the metal middle frame may be in a ground connection to a system, and the metal middle frame is grounded. Therefore, a voltage value of the metal middle frame 103 is zero volts. A gap exists between the display module 102 and the metal middle frame 103, and a size of the gap is about 0.3 mm. A gap also exists below a backlight unit in the display module. In addition, a touch module may also be disposed between the cover 101 and the display module 102. For example, in an external terminal, a touch module may be disposed between a cover and a display module. No limitation is imposed herein.

The following describes several terms involved in the present disclosure:

Cover: The cover 101 may be a glass cover (Cover Glass). The glass cover may also be referred to as a touchscreen cover, and is used to sealant or cover a component of a display module of a terminal. The cover is mainly made of a glass material, and a thickness of the cover is between 0.1 mm to 1.1 mm. Certainly, the cover may also be made of another material, and no specific limitation is imposed herein.

Display module: It is one of main components forming a finished product of a display screen, and mainly includes a backlight unit, a substrate, a drive circuit, a resistor, a capacitor, a plastic suite, and the like.

Metal middle frame: It is used to bear components of devices such as a display module, and is made of a metal material, for example, a metal middle frame made of aluminum.

In the prior art, dedicated piezoresistive materials are integrated on a pressure sensor, so that dedicated and independent pressure sensors are arranged in four corners below an LCD. However, costs of the dedicated piezoresistive materials are high, and a new provider needs to be developed for resource integration. Therefore, integration costs are also high. In the present disclosure, no dedicated and independent pressure sensor needs to be arranged in the four corners below the LCD. Instead, a gap between a display module and a metal middle frame or a gap below a backlight unit in a display module is mainly used, and an existing conducting material is used to form a capacitor, thereby implementing pressure touch control by detecting a capacitance change of the formed capacitor. A structure is as follows.

Figure 2:
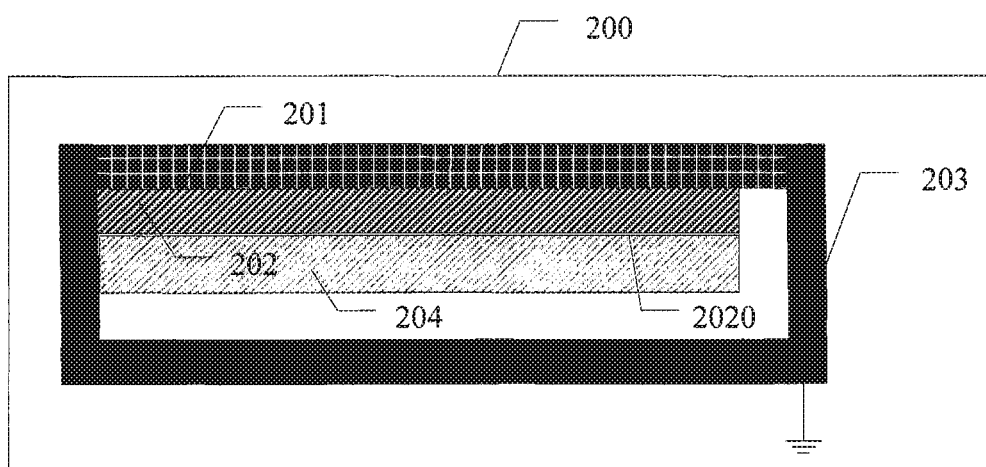
FIG. 2 is a schematic structural diagram of a terminal according to an embodiment of the present disclosure.

Referring to FIG. 2, FIG. 2 is an embodiment of a terminal 200 according to an embodiment of the present disclosure. The terminal 200 includes a cover 201, a display module 202, and a metal middle frame 203, where the display module 202 is located between the cover 201 and the metal middle frame 203, and the metal middle frame 203 is grounded. The terminal further includes:

a conducting layer 204, where the conducting layer 204 is attached to a lower surface 2020 of the display module 202.

As shown in FIG. 2, it may be understood that, observed from a direction perpendicular to a direction from a terminal top to a terminal bottom, an upper surface of the display module is attached to the cover, and the conducting layer is attached to the lower surface of the display module.

Different from the prior art, in this embodiment of the present disclosure, a material needed for the conducting layer is relatively common, and the material only needs to be conductive. Therefore, some existing conducting materials may be effectively used, and no dedicated pressure material is needed, thereby reducing material costs to a great extent.

In actual application, a gap with a size about 0.3 mm exists between a conducting module and a metal terminal, and a thickness of the conducting layer is about 0.1 mm. Therefore, the conducting layer is further attached to the lower surface of the display module.

Figure 2A:
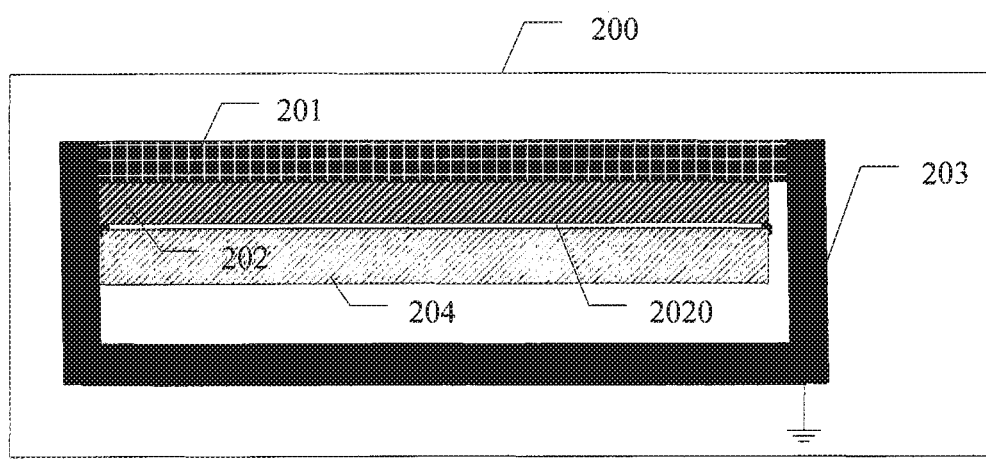
FIG. 2A and FIG. 2B are other schematic structural diagrams of a terminal according to an embodiment of the present disclosure.
Figure 2B:
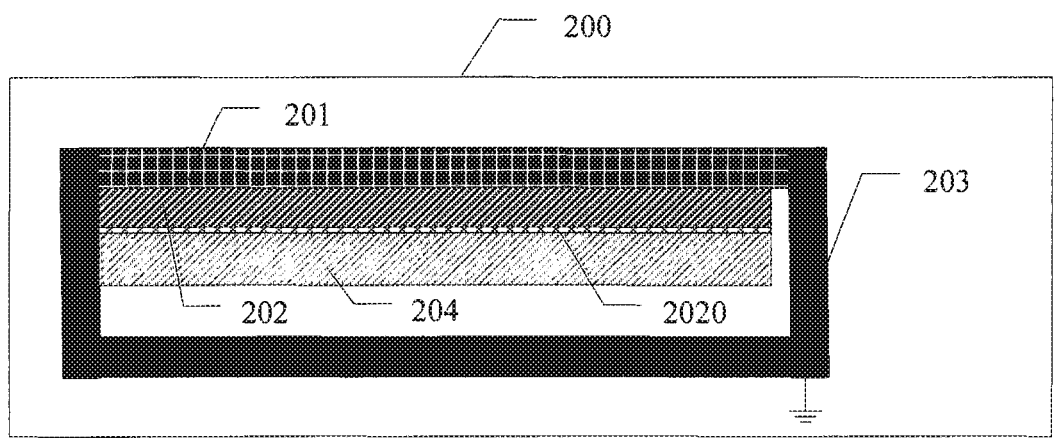

In actual application, the conducting layer is usually attached to the lower surface of the display module by using sealant or a whole surface of adhesive. In some cases, as shown in FIG. 2A, the conducting layer is fixed below the display module by using only sealant. In some cases, as shown in FIG. 2B, to ensure flatness of the conducting layer and stability of conducting performance of the conducting layer, the conducting layer may be attached to the lower surface of the display module by using a whole surface of adhesive (for example, a part between the conducting layer and the display module in FIG. 2B). In addition, the adhesive may be double-sided tape, an OCA, or the like. Specifically, selection may be performed according to an actual situation, and no specific limitation is imposed herein.

As shown in FIG. 2, at least one gap (for example, an area between the conducting layer and the metal middle frame in FIG. 2) exists between the conducting layer 204 and the metal middle frame 203. The conducting layer 204, the metal middle frame 203, and the at least one gap form at least one capacitor, where a capacitance change of the at least one capacitor reflects a magnitude of at least one pressure acted on the cover 201.

It may be understood that the conducting layer, the metal middle frame, and the at least one gap form at least one capacitor, where the conducting layer may be considered as one panel of the capacitor, the metal middle frame may be considered as the other panel of the capacitor, and the capacitor may be used as a pressure sensor. For example, a specific force is generated when a user presses the cover, and the conducting layer deforms because of action of the force. As a result, a distance between the two panels of the capacitor changes, and consequently, a capacitance of the capacitor changes and a magnitude of the pressure acted on the cover may further be reflected by the capacitance change of the capacitor. For example, the capacitor of this structure is used as a pressure sensor, and a pressure of 60 thousand levels from tapping to pressing may be sensed, so that different levels of pressures may be identified. However, only two levels of forces can be identified in the prior art: tapping and pressing.

It may be understood that the capacitance change of the capacitor is proportional to the magnitude of the pressure. For example, a greater capacitance change of the capacitor reflects a greater pressure acted on the cover, or a greater pressure acted on the cover results in a greater capacitance change of the capacitor.

Figure 3:
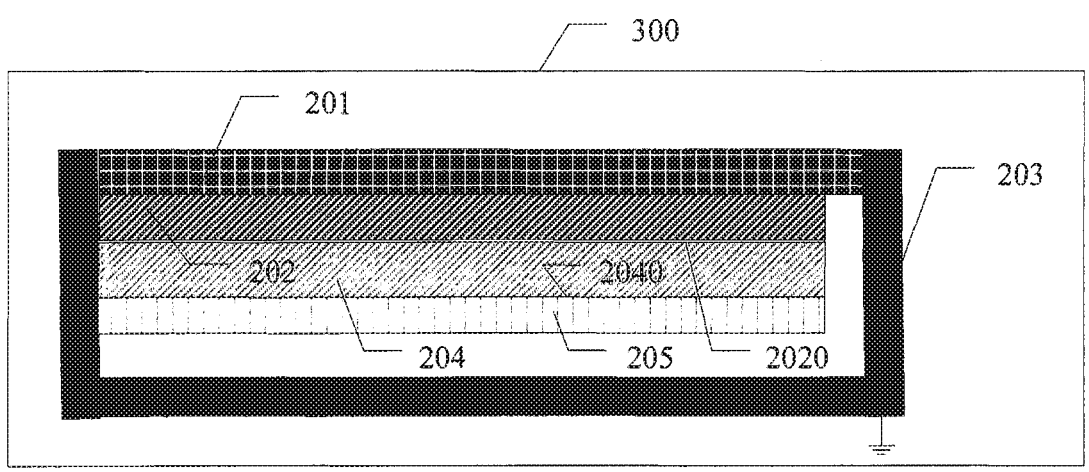
FIG. 3 is another schematic structural diagram of a terminal according to an embodiment of the present disclosure.
Figure 4:
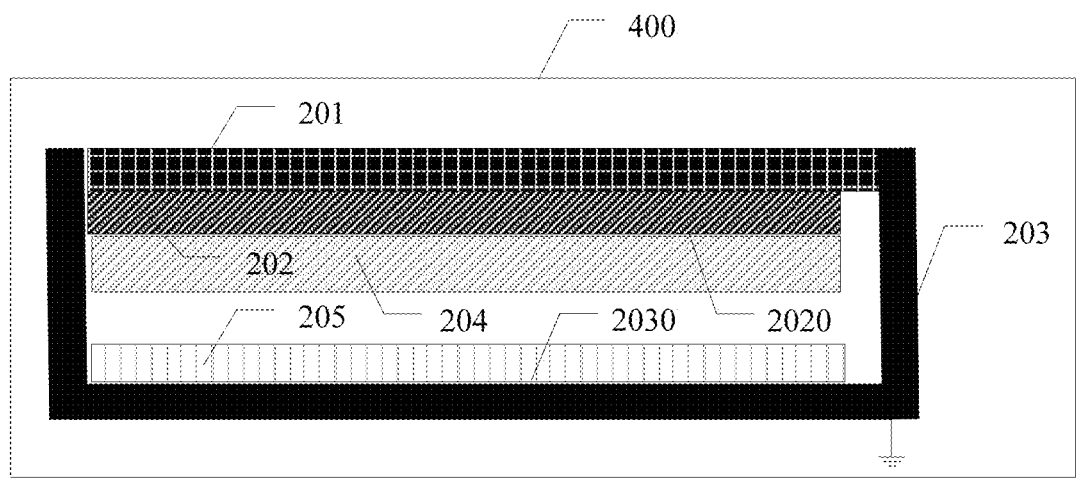
FIG. 4 is another schematic structural diagram of a terminal according to an embodiment of the present disclosure.

On the basis of the embodiment shown in FIG. 2, in some optional embodiments, as shown in FIG. 3 and FIG. 4, at least one elastic adhesive is adhered to a lower surface of the conducting layer or an upper surface of the metal middle frame.

As shown in FIG. 3, FIG. 3 is a schematic structural diagram of a terminal 300. At least one elastic adhesive 205 is attached to a lower surface 2040 of the conducting layer 204.

It may be understood that, an upper surface of the conducting layer is attached to the display module, so as to avoid an excessively large amount of deformation of the conducting layer. At least one elastic adhesive is adhered to the lower surface of the conducting layer. The elastic adhesive has an elastic compression effect in one aspect, and has an adhesion effect in another aspect. The elastic adhesive may be foam, or the like, which is not specifically limited herein.

As shown in FIG. 4, FIG. 4 is a schematic structural diagram of a terminal 400. At least one elastic adhesive 205 is adhered to an upper surface 2030 of the metal middle frame 203.

It may be understood that, a specific gap exists between the metal middle frame and the conducting layer. Therefore, to avoid an excessively large amount of deformation of the conducting layer, at least one elastic adhesive is adhered to the upper surface of the metal middle frame.

An excessively large amount of deformation of the conducting layer may cause the conducting layer to attach to the metal middle frame, and consequently, pressure touch control cannot be implemented. To avoid this in actual application, at least one elastic adhesive is adhered to the lower surface of the conducting layer or the upper surface of the metal middle frame. The elastic adhesive may be any adhesive that can be elastically compressed. The elastic adhesive has an elastic compression effect in one aspect, and has an adhesion effect in another aspect.

In this embodiment of the present disclosure, a conducting layer and a metal middle frame are insulated from each other, and in addition, a specific gap exists between the conducting layer and the metal middle frame, and a depth of the gap is generally about 0.2 mm. Therefore, at least one capacitor may be formed by using the conducting layer, the metal middle frame, and at least one gap between the conducting layer and the metal middle frame. Further, a magnitude of at least one pressure acted on a cover may be reflected by a capacitance change of the at least one capacitor. For example, when a user uses a finger to press a touchscreen cover of a terminal, the user imposes a specific pressure on the touchscreen cover, and the pressure imposed by the user causes a capacitance of the capacitor to change. The capacitance change of the capacitor may reflect the magnitude of the at least one pressure acted on the cover. Further, the terminal may receive a signal of the capacitance change of the capacitor, and therefore perform a corresponding operation, for example, turn up or turn down volume of the terminal.

Different from the prior art, a conducting material needed for the conducting layer is in existence, and no dedicated pressure material is needed. Therefore, the pressure touch control may be implemented without a need of developing a new provider for resource integration, thereby reducing integration costs.

Figure 5:
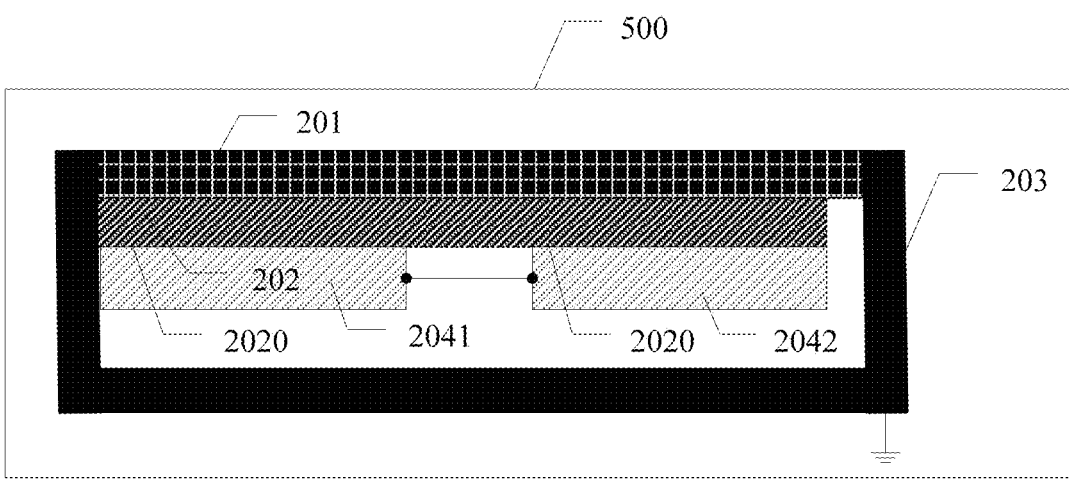
FIG. 5 is another schematic structural diagram of a terminal according to an embodiment of the present disclosure.

On the basis of the embodiments shown in FIG. 2, FIG. 3, and FIG. 4, further refer to FIG. 5. FIG. 5 is a schematic structural diagram of a terminal 500. The conducting layer 204 includes at least a first conducting block 2041 and a second conducting block 2042, where the first conducting block 2041 is connected to the second conducting block 2042.

It may be understood that, after the first conducting block is connected to the second conducting block, circuit connection is implemented between the first conducting block and the second conducting block. Therefore, the first conducting block and the second conducting block may share a power supply module of the terminal. For example, after the first conducting block obtains electric energy from the power supply module of the terminal, the second conducting block may directly obtain electric energy from the first conducting block without a need of connecting to a circuit of the power supply module of the terminal, thereby reducing space required for circuit arrangement. When the conducting layer, the metal middle frame, and a dielectric between them are used as a capacitor as a whole, because a screen of the terminal is generally large, a size of the conducting layer may be equal to a size of the screen of the terminal, so as to achieve a relatively good pressure detection effect. Therefore, a cross sectional area of the conducting layer is relatively large. However, a larger cross sectional area of the conducting layer indicates higher difficulty in implementing relatively good flatness detection. Consequently, when an external force acts on the cover of the terminal, difficulty in detecting a capacitance change of the capacitor increases accordingly, and it is also relatively difficult to implement a corresponding algorithm for reflecting a pressure change by detecting the capacitance change of the capacitor. Therefore, after the conducting layer is divided into the first conducting block and the second conducting block, difficulty in capacitance detection for each conducting block decreases, and the algorithm for reflecting the pressure change by detecting the capacitance change of the capacitor is more easily implemented. In addition, after the first conducting block is connected to the second conducting block, the first conducting block and the second conducting block may be used as a whole. This is more convenient for detecting the capacitance change of the whole capacitor.

In some optional embodiments, a specific gap exists between the metal middle frame and the conducting layer. Therefore, to avoid an excessively large amount of deformation of the conducting layer, at least one elastic adhesive is adhered to the upper surface of the metal middle frame, such as a first elastic adhesive corresponding to the first conducting block and a second elastic adhesive corresponding to the second conducting block. No specific limitation is imposed herein.

In some optional embodiments, the upper surface of the conducting layer is attached to the display module. Therefore, to avoid an excessively large amount of deformation of the conducting layer, at least one elastic adhesive is adhered to the lower surface of the conducting layer, such as a first elastic adhesive corresponding to the first conducting block and a second elastic adhesive corresponding to the second conducting block. No specific limitation is imposed herein. The elastic adhesive has an elastic compression effect in one aspect, and has an adhesion effect in another aspect. The elastic adhesive may be foam, or the like, which is not specifically limited herein.

Different from the prior art, the conducting layer is divided into different conducting blocks, and a mode between the conducting blocks may be a self-capacitance mode, or may be a mutual capacitance mode. The terminal may identify a position point that is on a conducting block and that is corresponding to a position point of pressure acted on the cover. In addition, the force acted on the cover causes deformation of the entire conducting layer, and deformation degrees of all position points on the conducting layer are also different. Therefore, capacitance changes of different capacitors may be sensed.

It should be noted that, a material of the conducting layer is an ITO film or a copper foil FPC, and certainly, may also be another conducting material. No specific limitation is imposed herein.

In this embodiment of the present disclosure, the conducting layer may include multiple conducting blocks, and the conducting blocks may be connected with each other, or may be disconnected from each other. This is not specifically limited herein. The first conducting block and the second conducting block are used as examples. The following further describes the first conducting block and the second conducting block.

The first conducting block 2041 and the second conducting block 2042 each are attached to the lower surface 2020 of the display module 202.

The first conducting block is attached to the lower surface of the display module by using sealant or a whole surface of adhesive, or the second conducting block is attached to the lower surface of the display module by using sealant or a whole surface of adhesive, where an attaching area of the first conducting block and an attaching area of the second conducting block do not overlap. For a specific attaching manner, refer to FIG. 2A and FIG. 2B, and details are not described herein.

Manners of attaching the first conducting block and the second conducting block to the lower surface of the display module are the same as the manner of attaching the conducting layer to the lower surface of the display module. For details, refer to the foregoing manner of attaching the conducting layer to the lower surface of the display module, and details are not described herein again.

A first gap (for example, a blank area between the first conducting block and the metal middle frame in FIG. 5) exists between the first conducting block 2041 and the metal middle frame 203. The first conducting block 2041, the metal middle frame 203, and the first gap form a first capacitor. That is, the first conducting block is considered as one panel of the first capacitor, and the metal middle frame is considered as the other panel of the first capacitor. A second gap (for example, a blank area between the second conducting block and the metal middle frame in FIG. 5) exists between the second conducting block 2042 and the metal middle frame 203. The second conducting block 2042, the metal middle frame 203, and the second gap form a second capacitor. That is, the second conducting block is considered as one panel of the second capacitor, and the metal middle frame is considered as the other panel of the second capacitor. Capacitance changes of the first capacitor and the second capacitor reflect a magnitude of a first pressure acted on the cover 201.

In this embodiment of the present disclosure, a first conducting block, a metal middle frame, and a first gap form a first capacitor, and a second conducting block, the metal middle frame, and a second gap form a second capacitor. Because the first conducting block is connected to the second conducting block, capacitance changes of the first capacitor and the second capacitor reflect a magnitude of a first pressure acted on a cover. For example, when a single finger presses a touchscreen cover, a pressure imposed by the single finger may cause capacitances of the first capacitor and the second capacitor to change. Therefore, the capacitance changes of the first capacitor and the second capacitor may reflect a magnitude of the pressure that is generated by the pressing by the single finger and that is acted on the touchscreen cover.

Figure 6:
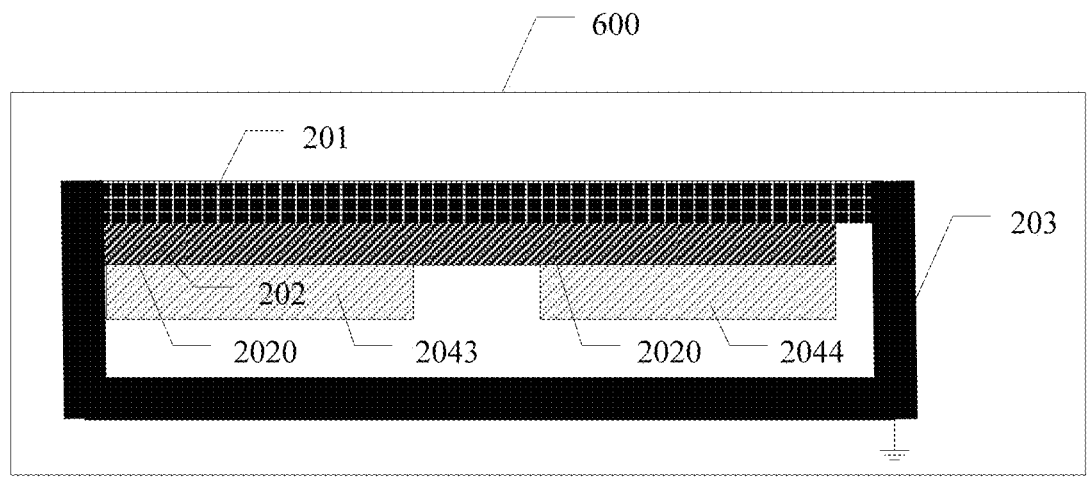
FIG. 6 is another schematic structural diagram of a terminal according to an embodiment of the present disclosure.

On the basis of the embodiments shown in FIG. 2, FIG. 3, and FIG. 4, further refer to FIG. 6. FIG. 6 is a schematic structural diagram of a terminal 600. The conducting layer 204 includes at least a third conducting block 2043 and a fourth conducting block 2044, where the third conducting block 2043 is not connected to the fourth conducting block 2044.

Different from the prior art, the conducting layer is divided into different conducting blocks, and a mode between the conducting blocks may be a self-capacitance mode, or may be a mutual capacitance mode. The terminal may identify a position point that is on a conducting block and that is corresponding to a position point of pressure acted on the cover. In addition, the force acted on the cover causes deformation of the entire conducting layer, and deformation degrees of all position points on the conducting layer are also different. Therefore, capacitance changes of different capacitors may be sensed. In addition, a quantity of conducting blocks is corresponding to a quantity of areas obtained by dividing the screen of the terminal.

It should be noted that, a material of the conducting layer is an ITO film or an FPC, and certainly, may also be another conducting material. No specific limitation is imposed herein.

The third conducting block 2043 and the fourth conducting block 2044 each are attached to the lower surface 2020 of the display module 202.

The third conducting block is attached to the lower surface of the display module by using sealant or a whole surface of adhesive, or the fourth conducting block is attached to the lower surface of the display module by using sealant or a whole surface of adhesive, where an attaching area of the third conducting block and an attaching area of the fourth conducting block do not overlap. For a specific attaching manner, refer to FIG. 2A and FIG. 2B, and details are not described herein.

Manners of attaching the third conducting block and the fourth conducting block to the lower surface of the display module are the same as the manner of attaching the conducting layer to the lower surface of the display module. For details, refer to the foregoing manner of attaching the conducting layer to the lower surface of the display module, and details are not described herein again.

In some optional embodiments, the upper surface of the conducting layer is attached to the display module. Therefore, to avoid an excessively large amount of deformation of the conducting layer, at least one elastic adhesive is adhered to the lower surface of the conducting layer, such as a third elastic adhesive corresponding to the third conducting block and a fourth elastic adhesive corresponding to the fourth conducting block. No specific limitation is imposed herein. The elastic adhesive has an elastic compression effect in one aspect, and has an adhesion effect in another aspect. The elastic adhesive may be foam, or the like, which is not specifically limited herein.

A third gap (for example, a blank area between the third conducting block and the metal middle frame in FIG. 6) exists between the third conducting block 2043 and the metal middle frame 203. The third conducting block 2043, the metal middle frame 203, and the third gap form a third capacitor. That is, the third conducting block is considered as one panel of the third capacitor, and the metal middle frame is considered as the other panel of the third capacitor. A capacitance change of the third capacitor reflects a magnitude of a second pressure acted on the cover 201.

A fourth gap (for example, a blank area between the fourth conducting block and the metal middle frame in FIG. 6) exists between the fourth conducting block 2044 and the metal middle frame 203. The fourth conducting block 2044, the metal middle frame 203, and the fourth gap form a fourth capacitor. That is, the fourth conducting block is considered as one panel of the fourth capacitor, and the metal middle frame is considered as the other panel of the fourth capacitor. A capacitance change of the fourth capacitor reflects a magnitude of a third pressure acted on the cover 201.

In some optional embodiments, a specific gap exists between the metal middle frame and the conducting layer. Therefore, to avoid an excessively large amount of deformation of the conducting layer, at least one elastic adhesive is adhered to the upper surface of the metal middle frame, such as a third elastic adhesive corresponding to the third conducting block and a fourth elastic adhesive corresponding to the fourth conducting block. No specific limitation is imposed herein.

In this embodiment of the present disclosure, a third conducting block, a metal middle frame, and a third gap form a third capacitor, and a fourth conducting block, the metal middle frame, and a fourth gap form a fourth capacitor. Because the third conducting block is not connected to the fourth conducting block, a capacitance change of the third capacitor reflects a magnitude of a second pressure acted on a cover, and a capacitance change of the fourth capacitor reflects a magnitude of a third pressure acted on the cover. For example, when two fingers press a touchscreen cover, a first finger of the two fingers acts on a first area, of the cover, corresponding to the first conducting block, and a second finger of the two fingers acts on a second area, of the cover, corresponding to the second conducting block. A pressure generated by the first finger causes a capacitance of the third capacitor to change, and a pressure generated by the second finger causes a capacitance of the fourth capacitor to change. Therefore, a capacitance change of the third capacitor may reflect a magnitude of the pressure that is generated by the pressing by the first finger of the two fingers and that is acted on the touchscreen cover, and a capacitance change of the fourth capacitor may reflect a magnitude of the pressure that is generated by the pressing by the second finger of the two fingers and that is acted on the touchscreen cover. It can be seen that, the first conducting block is not connected to the second conducting block, so that multi-finger pressure touch control may be implemented, thereby effectively improving user experience.

Figure 7:
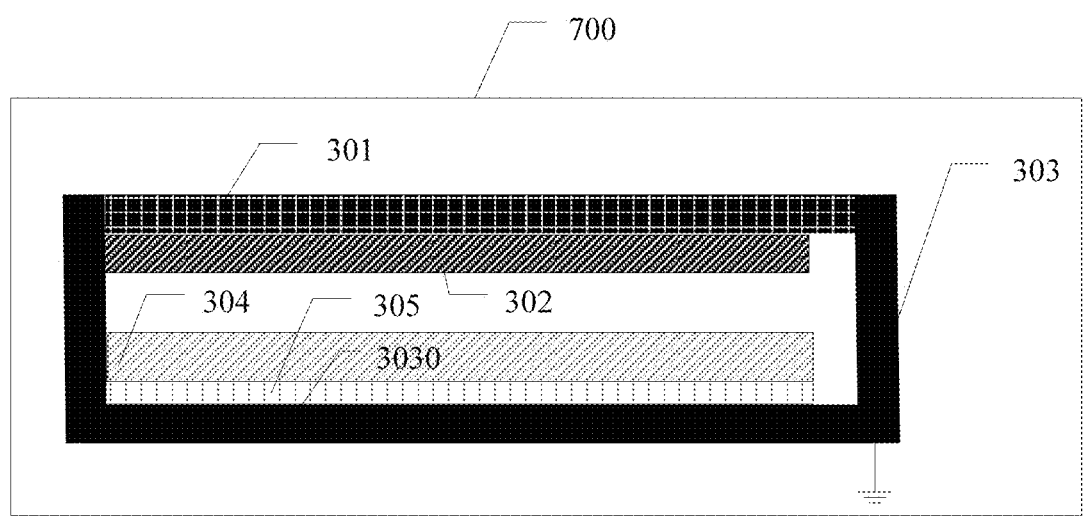
FIG. 7 is another schematic structural diagram of a terminal according to an embodiment of the present disclosure.

On the basis of the embodiments shown in FIG. 2 to FIG. 5, refer to FIG. 7. FIG. 7 is a schematic structural diagram of a terminal 700. The terminal 700 includes a cover 301, a display module 302, and a metal middle frame 303, where the display module 302 is located between the cover 301 and the metal middle frame 303, and the metal middle frame 303 is grounded. The terminal 700 further includes:

a conducting layer 304, where the conducting layer 304 is attached to an upper surface 3030 of the metal middle frame 303 by using at least one elastic adhesive 305, where the at least one elastic adhesive 305 is non-conductive. The conducting layer 304, the metal middle frame 303, and the at least one elastic adhesive 305 form at least one capacitor. That is, the conducting layer is used as one panel of the capacitor, and the metal middle frame is used as the other panel of the capacitor. A capacitance change of the at least one capacitor reflects a magnitude of at least one pressure acted on the cover 301.

As shown in FIG. 7, an elastic adhesive is adhered to the upper surface of the metal middle frame. Further, the conducting layer is attached to an upper surface of the elastic adhesive. In other words, the conducting layer and the metal middle frame are attached by using the elastic adhesive.

The elastic adhesive may be any adhesive that can be elastically compressed. The elastic adhesive has an elastic compression effect in one aspect, and has an adhesion effect in another aspect.

A material of the conducting layer is an ITO film or a copper foil FPC.

In this embodiment of the present disclosure, a conducting layer and a metal middle frame are insulated from each other, and the conducting layer and the metal middle frame are attached by using an elastic adhesive, where the elastic adhesive is non-conductive, and the conducting layer, the metal middle frame, and at least one elastic adhesive form at least one capacitor. Therefore, further, a magnitude of at least one pressure acted on a cover may be reflected by a capacitance change of the at least one capacitor. For example, when a user uses a finger to press a touchscreen cover of a terminal, the user imposes a specific pressure on the touchscreen cover, and the pressure imposed by the user causes a capacitance of the capacitor to change. The capacitance change of the capacitor may reflect the magnitude of the at least one pressure acted on the cover. Further, the terminal may receive a signal of the capacitance change of the capacitor, and therefore perform a corresponding operation, for example, turn up or turn down volume of the terminal.

Different from the prior art, a conducting material needed for the conducting layer is in existence, and no dedicated pressure material is needed. Therefore, material costs are reduced, and pressure touch control is implemented without a need of developing a new provider for resource integration, thereby reducing integration costs.

Figure 8:
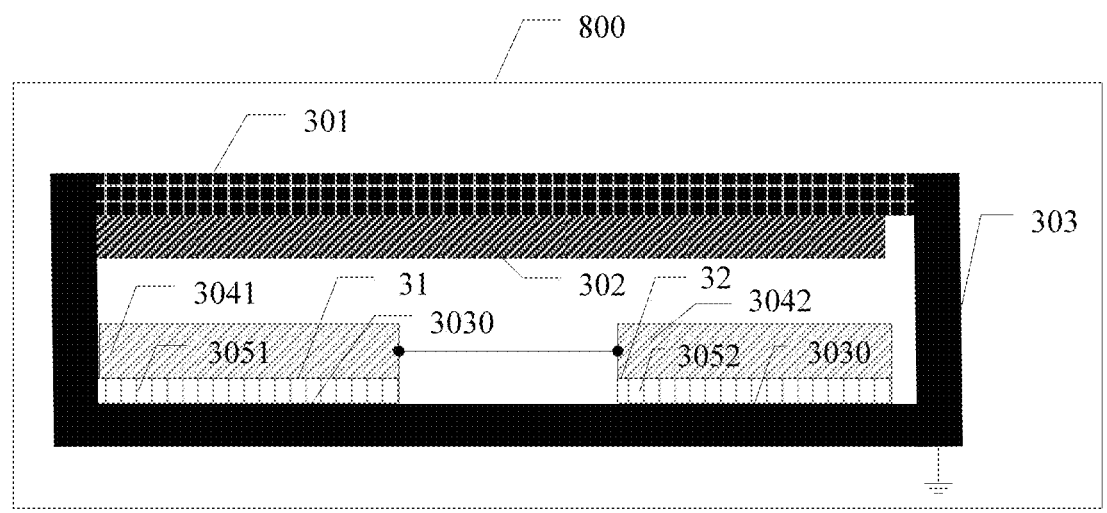
FIG. 8 is another schematic structural diagram of a terminal according to an embodiment of the present disclosure.

On the basis of the embodiment shown in FIG. 7, refer to FIG. 8. FIG. 8 is a schematic structural diagram of a terminal 800. The conducting layer 304 includes at least a first conducting block 3041 and a second conducting block 3042, where the first conducting block 3041 is connected to the second conducting block 3042.

It may be understood that, after the first conducting block is connected to the second conducting block, circuit connection is implemented between the first conducting block and the second conducting block. Therefore, the first conducting block and the second conducting block may share a power supply module of the terminal. For example, after the first conducting block obtains electric energy from the power supply module of the terminal, the second conducting block may directly obtain electric energy from the first conducting block without a need of connecting to a circuit of the power supply module of the terminal, thereby reducing space required for circuit arrangement. In addition, after the first conducting block is connected to the second conducting block, the first conducting block and the second conducting block may be used as a whole. This is more convenient for detecting the capacitance change of the whole capacitor.

A material of the conducting layer is an ITO film or a copper foil FPC.

The first conducting block 3041 is attached to an upper surface 31 of a first elastic adhesive 3051. The first conducting block 3041, the metal middle frame 303, and the first elastic adhesive 3051 form a first capacitor. That is, the first conducting block is considered as one panel of the first capacitor, and the metal middle frame is considered as the other panel of the first capacitor.

The second conducting block 3042 is attached to an upper surface 32 of a second elastic adhesive 3052. The second conducting block 3042, the metal middle frame 303, and the second elastic adhesive 3052 form a second capacitor. That is, the second conducting block is considered as one panel of the second capacitor, and the metal middle frame is considered as the other panel of the second capacitor. Capacitance changes of the first capacitor and the second capacitor reflect a magnitude of a first pressure acted on the cover 301.

It should be noted that, the first elastic adhesive and the second elastic adhesive may be connected to each other, or may be disconnected from each other. This is not specifically limited herein.

The first conducting block may be directly attached to the first elastic adhesive, or may be attached to the first elastic adhesive by using any adhesive. Specifically, selection may be performed according to an actual situation, and no specific limitation is imposed herein.

In this embodiment of the present disclosure, a first conducting block, a metal middle frame, and a first elastic adhesive form a first capacitor, and a second conducting block, the metal middle frame, and a second elastic adhesive form a second capacitor. Because the first conducting block is connected to the second conducting block, capacitance changes of the first capacitor and the second capacitor reflect a magnitude of a first pressure acted on a cover. For example, when a single finger presses a touchscreen cover, a pressure imposed by the single finger may cause capacitances of the first capacitor and the second capacitor to change. Therefore, the capacitance changes of the first capacitor and the second capacitor may reflect a magnitude of the pressure that is generated by the pressing by the single finger and that is acted on the touchscreen cover.

Different from the prior art, the conducting layer is divided into different conducting blocks, and a mode between the conducting blocks may be a self-capacitance mode, or may be a mutual capacitance mode. The terminal may identify a position point that is on a conducting block and that is corresponding to a position point of pressure acted on the cover. In addition, the force acted on the cover causes deformation of the entire conducting layer, and deformation degrees of all position points on the conducting layer are also different. Therefore, capacitance changes of different capacitors may be sensed.

It should be noted that, a material of the conducting layer is an ITO film or an FPC, and certainly, may also be another conducting material. No specific limitation is imposed herein.

Figure 9:
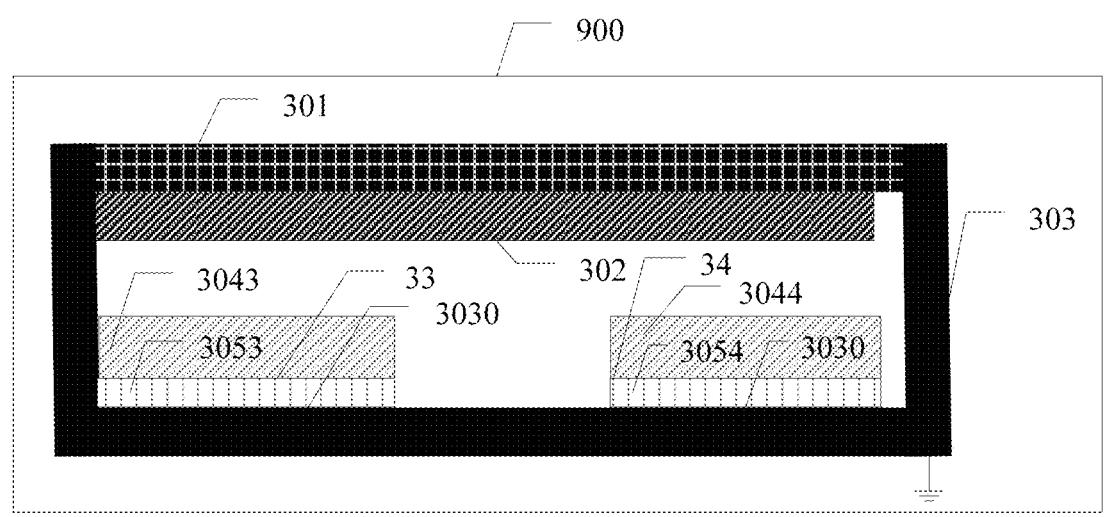
FIG. 9 is another schematic structural diagram of a terminal according to an embodiment of the present disclosure.

On the basis of the embodiment shown in FIG. 7, refer to FIG. 9. The conducting layer 304 includes at least a third conducting block 3043 and a fourth conducting block 3044, where the third conducting block 3043 is not connected to the fourth conducting block 3044.

Different from the prior art, the conducting layer is divided into different conducting blocks, and a mode between the conducting blocks may be a self-capacitance mode, or may be a mutual capacitance mode. The terminal may identify a position point that is on a conducting block and that is corresponding to a position point of pressure acted on the cover. In addition, the force acted on the cover causes deformation of the entire conducting layer, and deformation degrees of all position points on the conducting layer are also different. Therefore, capacitance changes of different capacitors may be sensed.

A material of the conducting layer is an ITO film or a copper foil FPC.

The third conducting block 3043 is attached to an upper surface 33 of a third elastic adhesive 3053. The third conducting block 3043, the metal middle frame 303, and the third elastic adhesive 3053 form a third capacitor. That is, the third conducting block is considered as one panel of the third capacitor, and the metal middle frame is considered as the other panel of the third capacitor. A capacitance change of the third capacitor reflects a magnitude of a second pressure acted on the cover 301.

The fourth conducting block 3044 is attached to an upper surface 34 of a fourth elastic adhesive 3054. The fourth conducting block 3044, the metal middle frame 303, and the fourth elastic adhesive 3054 form a fourth capacitor. That is, the fourth conducting block is considered as one panel of the fourth capacitor, and the metal middle frame is considered as the other panel of the fourth capacitor. A capacitance change of the fourth capacitor reflects a magnitude of a third pressure acted on the cover 301.

It should be noted that, the third elastic adhesive and the fourth elastic adhesive may be connected to each other, or may be disconnected from each other. This is not specifically limited herein.

In this embodiment of the present disclosure, a third conducting block, a metal middle frame, and a third elastic adhesive form a third capacitor, and a fourth conducting block, the metal middle frame, and a fourth elastic adhesive form a fourth capacitor. Because the third conducting block is not connected to the fourth conducting block, a capacitance change of the third capacitor reflects a magnitude of a second pressure acted on a cover, and a capacitance change of the fourth capacitor reflects a magnitude of a third pressure acted on the cover. For example, when two fingers press a touchscreen cover, a first finger of the two fingers acts on a first area, of the cover, corresponding to the first conducting block, and a second finger of the two fingers acts on a second area, of the cover, corresponding to the second conducting block. A pressure generated by the first finger causes a capacitance of the third capacitor to change, and a pressure generated by the second finger causes a capacitance of the fourth capacitor to change. Therefore, a capacitance change of the third capacitor may reflect a magnitude of the pressure that is generated by the pressing by one of the two fingers and that is acted on the touchscreen cover, and a capacitance change of the fourth capacitor may reflect a magnitude of the pressure that is generated by the pressing by the other finger of the two fingers and that is acted on the touchscreen cover. It can be seen that, the first conducting block is not connected to the second conducting block, so that multi-finger touch control may be implemented, thereby effectively improving user experience.

Figure 10:
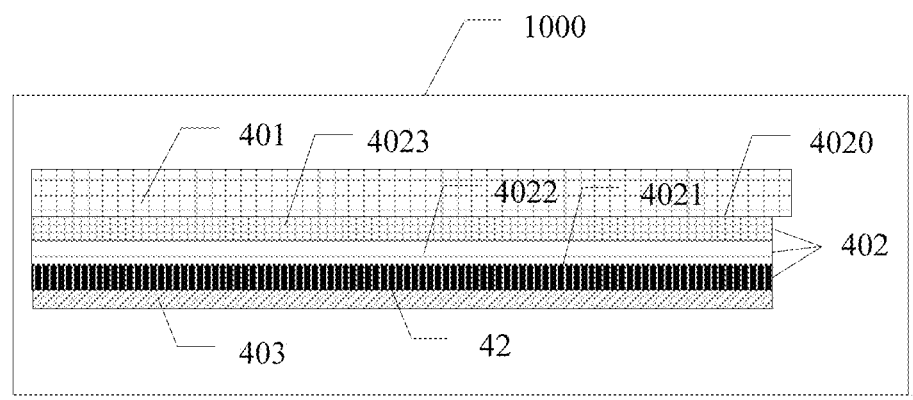
FIG. 10 is another schematic structural diagram of a terminal according to an embodiment of the present disclosure.

On the basis of the foregoing embodiments, refer to FIG. 10. FIG. 10 is a schematic structural diagram of a terminal 1000. The terminal 1000 includes a cover 401 and a display module 402, where the cover 401 is located on an upper surface 4020 of the display module 402. The display module 402 includes a backlight unit 4021, a TFT substrate 4022, and a TFT circuit 4023, where the TFT substrate 4022 is located between the backlight unit 4021 and the TFT circuit 4023, and the TFT circuit 4023 includes a constant voltage layer. The terminal further includes:

a conducting layer 403, where the conducting layer 403 is attached to a lower surface 42 of the backlight unit 4021.

It should be noted that, the cover is located above the display module. "Above" refers to an upper-lower position relationship at a structural layer of the terminal.

A dielectric exists between the conducting layer 403 and the constant voltage layer of the TFT circuit 4023. The conducting layer 403, the constant voltage layer of the TFT circuit 4023, and the dielectric form at least one capacitor. That is, the conducting layer is considered as one panel of the capacitor, and the constant voltage layer of the TFT circuit is considered as the other panel of the capacitor. A capacitance change of the at least one capacitor reflects a magnitude of at least one pressure acted on the cover 401, and the dielectric includes the TFT substrate 4022.

The conducting layer may be attached to a lower surface of the backlight unit by using an adhesive. The adhesive may be double-sided tape, an OCA, or the like. Specifically, selection may be performed according to an actual situation, and no specific limitation is imposed herein.

It may be understood that the capacitance change of the capacitor is proportional to the magnitude of the pressure. For example, a greater capacitance change of the capacitor reflects a greater pressure acted on the cover, or a greater pressure acted on the cover results in a greater capacitance change of the capacitor.

In this embodiment of the present disclosure, a conducting layer and a constant voltage layer of a TFT circuit are insulated from each other, and in addition, a dielectric exists between the conducting layer and the constant voltage layer of the TFT circuit. Therefore, at least one capacitor may be formed by using the conducting layer, the constant voltage layer of the TFT circuit, and the dielectric between the conducting layer and the constant voltage layer of the TFT circuit. Further, a magnitude of at least one pressure acted on a cover may be reflected by a capacitance change of the at least one capacitor. For example, when a user uses a finger to press a touchscreen cover of a terminal, the user imposes a specific pressure on the touchscreen cover, and the pressure imposed by the user causes a capacitance of the capacitor to change. A capacitance change of the capacitor may reflect the magnitude of the at least one pressure acted on the cover. Further, the terminal may receive a signal of the capacitance change of the capacitor, and therefore perform a corresponding operation, for example, turn up or turn down volume of the terminal.

Figure 11:
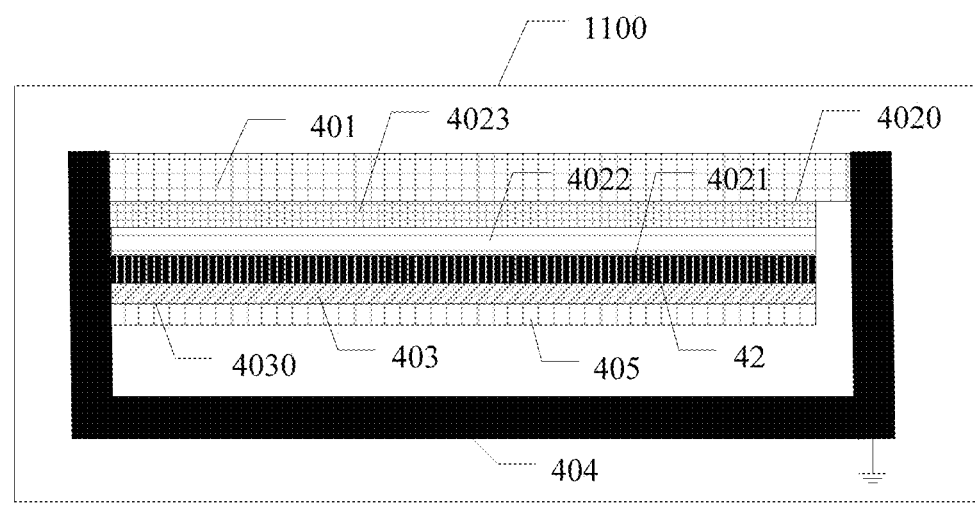
FIG. 11 is another schematic structural diagram of a terminal according to an embodiment of the present disclosure.
Figure 12:
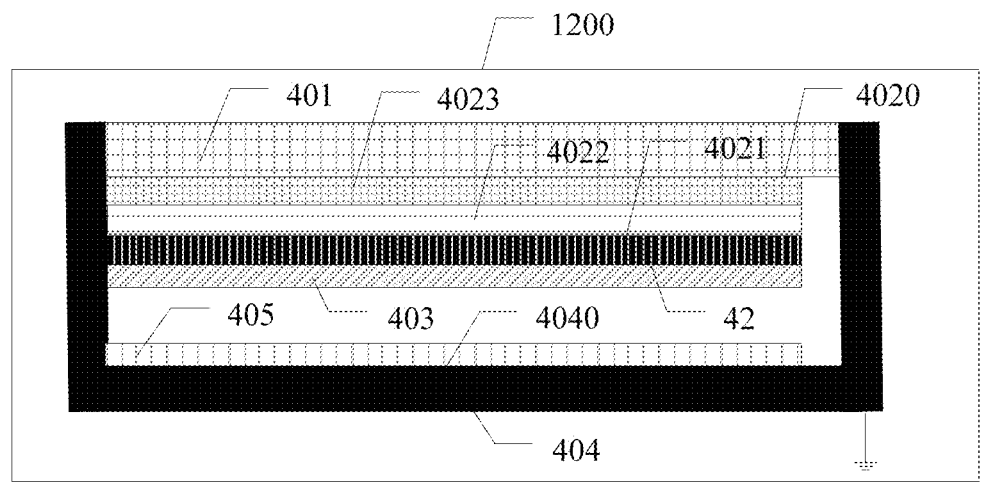
FIG. 12 is another schematic structural diagram of a terminal according to an embodiment of the present disclosure.

On the basis of the embodiment shown in FIG. 10, in some optional embodiments, as shown in FIG. 11 and FIG. 12, FIG. 11 and FIG. 12 are respectively a schematic structural diagram of a terminal 1100 and a schematic structural diagram of a terminal 1200. The terminal 1100 and the terminal 1200 further include:

a metal middle frame 404, where the metal middle frame 404 is located below the conducting layer 403.

It may be understood that, the metal middle frame is located below the conducting layer, and the conducting layer is perpendicularly below the screen of the terminal.

At least one elastic adhesive 405 is adhered to a lower surface 4030 of the conducting layer 403 or an upper surface 4040 of the metal middle frame 404.

As shown in FIG. 11, at least one elastic adhesive 405 is adhered to the lower surface of the conducting layer.

As shown in FIG. 12, at least one elastic adhesive 405 is adhered to the upper surface of the metal middle frame.

An excessively large amount of deformation of the conducting layer may cause the conducting layer to attach to the metal middle frame, and consequently, pressure touch control cannot be implemented. To avoid this in actual application, at least one elastic adhesive is adhered to the lower surface of the conducting layer or the upper surface of the metal middle frame. The elastic adhesive may be any adhesive that can be elastically compressed. The elastic adhesive has an elastic compression effect in one aspect, and has an adhesion effect in another aspect.

A material of the conducting layer is an ITO film or an FPC, which is not specifically limited herein.

Figure 13:
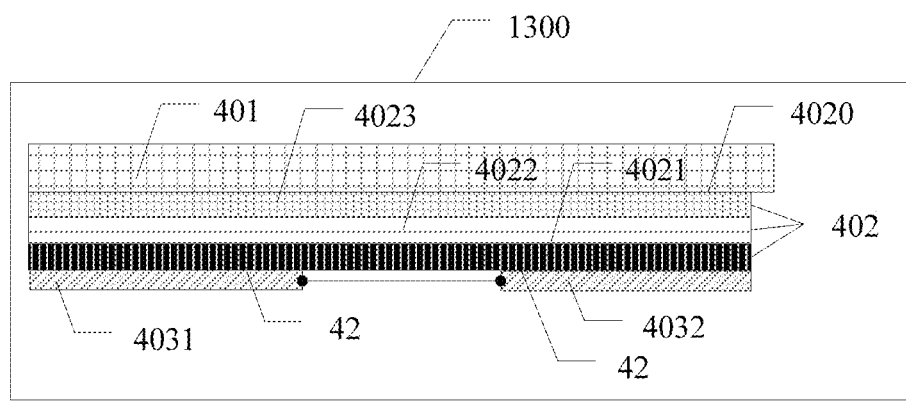
FIG. 13 is another schematic structural diagram of a terminal according to an embodiment of the present disclosure.

On the basis of the embodiments shown in FIG. 10, FIG. 11, and FIG. 12, refer to FIG. 13. FIG. 13 is a schematic structural diagram of a terminal 1300. The conducting layer 403 includes at least a first conducting block 4031 and a second conducting block 4032, where the first conducting block 4031 is connected to the second conducting block 4032.

Different from the prior art, the conducting layer is divided into different conducting blocks, and a mode between the conducting blocks may be a self-capacitance mode, or may be a mutual capacitance mode. The terminal may identify a position point that is on a conducting block and that is corresponding to a position point of pressure acted on the cover. In addition, the force acted on the cover causes deformation of the entire conducting layer, and deformation degrees of all position points on the conducting layer are also different. Therefore, capacitance changes of different capacitors may be sensed.

It may be understood that, after the first conducting block is connected to the second conducting block, circuit connection is implemented between the first conducting block and the second conducting block. Therefore, the first conducting block and the second conducting block may share a power supply module of the terminal. For example, after the first conducting block obtains electric energy from the power supply module of the terminal, the second conducting block may directly obtain electric energy from the first conducting block without a need of connecting to a circuit of the power supply module of the terminal, thereby reducing space required for circuit arrangement.

The first conducting block 4031 and the second conducting block 4032 each are attached to the lower surface 42 of the backlight unit 4021.

In some optional embodiments, a specific gap exists between the metal middle frame and the conducting layer. Therefore, to avoid an excessively large amount of deformation of the conducting layer, at least one elastic adhesive is adhered to the upper surface of the metal middle frame, such as a first elastic adhesive corresponding to the first conducting block and a second elastic adhesive corresponding to the second conducting block. No specific limitation is imposed herein.

In some optional embodiments, the upper surface of the conducting layer is attached to the display module. Therefore, to avoid an excessively large amount of deformation of the conducting layer, at least one elastic adhesive is adhered to the lower surface of the conducting layer, such as a first elastic adhesive corresponding to the first conducting block and a second elastic adhesive corresponding to the second conducting block. No specific limitation is imposed herein. The elastic adhesive has an elastic compression effect in one aspect, and has an adhesion effect in another aspect. The elastic adhesive may be foam, or the like, which is not specifically limited herein.

A first dielectric exists between the first conducting block 4031 and the constant voltage layer of the TFT circuit 4023. The first conducting block 4031, the constant voltage layer of the TFT circuit 4023, and the first dielectric form a first capacitor. That is, the first conducting block is considered as one panel of the first capacitor, and the constant voltage layer of the TFT circuit is considered as the other panel of the first capacitor. A second dielectric exists between the second conducting block 4032 and the constant voltage layer of the TFT circuit 4023. The second conducting block 4032, the constant voltage layer of the TFT circuit 4023, and the second dielectric form a second capacitor. That is, the second conducting block is considered as one panel of the second capacitor, and the constant voltage layer of the TFT circuit is considered as the other panel of the second capacitor. Capacitance changes of the first capacitor and the second capacitor reflect a magnitude of a first pressure acted on the cover 401.

In this embodiment of the present disclosure, a first conducting block, a constant voltage layer of a TFT circuit, and a first dielectric form a first capacitor, and a second conducting block, the constant voltage layer of the TFT circuit, and a second dielectric form a second capacitor. Because the first conducting block is connected to the second conducting block, capacitance changes of the first capacitor and the second capacitor reflect a magnitude of a first pressure acted on a cover. For example, when a single finger presses a touchscreen cover, a pressure imposed by the single finger may cause capacitances of the first capacitor and the second capacitor to change. Therefore, the capacitance changes of the first capacitor and the second capacitor may reflect a magnitude of the pressure that is generated by the pressing by the single finger and that is acted on the touchscreen cover.

Figure 14:
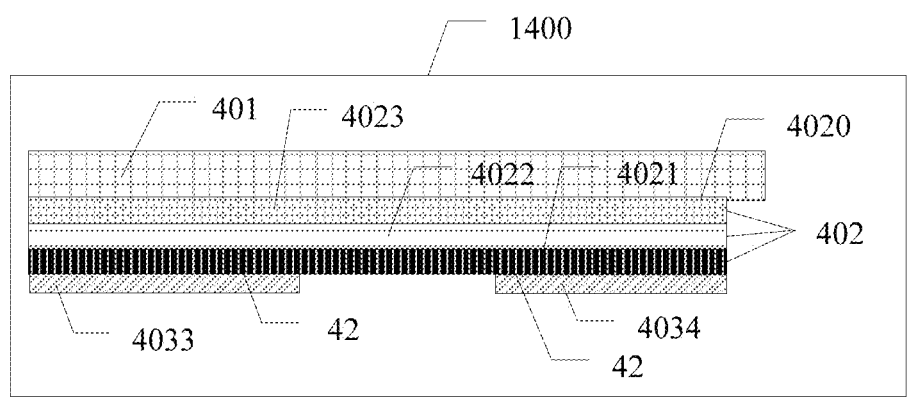
FIG. 14 is another schematic structural diagram of a terminal according to an embodiment of the present disclosure.

On the basis of the embodiments shown in FIG. 10, FIG. 11, and FIG. 12, refer to FIG. 14. FIG. 14 is a schematic structural diagram of a terminal 1400. The conducting layer 403 includes at least a third conducting block 4033 and a fourth conducting block 4034, where the third conducting block 4033 is not connected to the fourth conducting block 4034.

Different from the prior art, the conducting layer is divided into different conducting blocks, and a mode between the conducting blocks may be a self-capacitance mode, or may be a mutual capacitance mode. The terminal may identify a position point that is on a conducting block and that is corresponding to a position point of pressure acted on the cover.

The third conducting block 4033 and the fourth conducting block 4034 each are attached to the lower surface 42 of the backlight unit 4021.

In some optional embodiments, a specific gap exists between the metal middle frame and the conducting layer. Therefore, to avoid an excessively large amount of deformation of the conducting layer, at least one elastic adhesive is adhered to the upper surface of the metal middle frame, such as a third elastic adhesive corresponding to the third conducting block and a fourth elastic adhesive corresponding to the fourth conducting block. No specific limitation is imposed herein.

In some optional embodiments, the upper surface of the conducting layer is attached to the display module. Therefore, to avoid an excessively large amount of deformation of the conducting layer, at least one elastic adhesive is adhered to the lower surface of the conducting layer, such as a third elastic adhesive corresponding to the third conducting block and a fourth elastic adhesive corresponding to the fourth conducting block. No specific limitation is imposed herein. The elastic adhesive has an elastic compression effect in one aspect, and has an adhesion effect in another aspect. The elastic adhesive may be foam, or the like, which is not specifically limited herein.

A third dielectric exists between the third conducting block 4033 and the constant voltage layer of the TFT circuit 4023. The third conducting block 4033, the constant voltage layer of the TFT circuit 4023, and the third dielectric form a third capacitor. That is, the third conducting block is considered as one panel of the third capacitor, and the constant voltage layer of the TFT circuit is considered as the other panel of the third capacitor. A capacitance change of the third capacitor reflects a magnitude of a second pressure acted on the cover 401.

A fourth dielectric exists between the fourth conducting block 4034 and the constant voltage layer of the TFT circuit 4023. The fourth conducting block 4034, the constant voltage layer of the TFT circuit 4023, and the fourth dielectric form a fourth capacitor. That is, the fourth conducting block is considered as one panel of the fourth capacitor, and the constant voltage layer of the TFT circuit is considered as the other panel of the fourth capacitor. A capacitance change of the fourth capacitor reflects a magnitude of a third pressure acted on the cover 401.

In this embodiment of the present disclosure, a third conducting block, a constant voltage layer of a TFT circuit, and a third dielectric form a third capacitor, and a fourth conducting block, the constant voltage layer of the TFT circuit, and a fourth dielectric form a fourth capacitor. Because the third conducting block is not connected to the fourth conducting block, a capacitance change of the third capacitor reflects a magnitude of a second pressure acted on a cover, and a capacitance change of the fourth capacitor reflects a magnitude of a third pressure acted on the cover. For example, when two fingers press a touchscreen cover, a first finger of the two fingers acts on a first area, of the cover, corresponding to the first conducting block, and a second finger of the two fingers acts on a second area, of the cover, corresponding to the second conducting block. A pressure generated by the first finger causes a capacitance of the third capacitor to change, and a pressure generated by the second finger causes a capacitance of the fourth capacitor to change. Therefore, a capacitance change of the third capacitor may reflect a magnitude of the pressure that is generated by the pressing by one of the two fingers and that is acted on the touchscreen cover, and a capacitance change of the fourth capacitor may reflect a magnitude of the pressure that is generated by the pressing by the other finger of the two fingers and that is acted on the touchscreen cover. It can be seen that, the first conducting block is not connected to the second conducting block, so that multi-finger touch control may be implemented, thereby effectively improving user experience.

Figure 15:
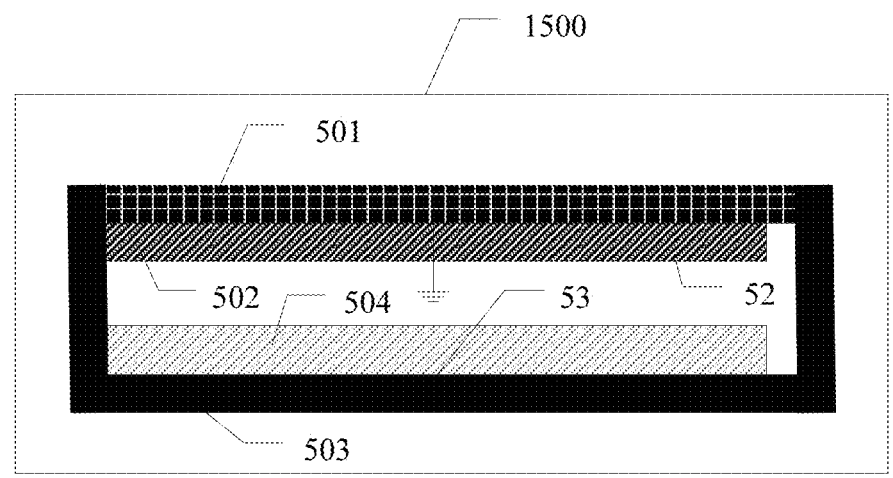
FIG. 15 is another schematic structural diagram of a terminal according to an embodiment of the present disclosure.

Based on the foregoing embodiments, refer to FIG. 15. FIG. 15 is a schematic structural diagram of a terminal 1500. The terminal 1500 includes a cover 501, a display module 502, and a middle frame 503, where the display module 502 is located between the cover 501 and the middle frame 503. The terminal 500 further includes:

a conducting layer 504, where the conducting layer 504 is attached to an upper surface 53 of the middle frame 503.

In actual application, the conducting layer is usually attached to the upper surface of the middle frame by using sealant or a whole surface of adhesive. In some cases, the conducting layer is fixed on the upper surface of the middle frame by using only sealant. In some cases, to ensure flatness of the conducting layer and stability of conducting performance of the conducting layer, the conducting layer may be attached to the upper surface of the middle frame by using a whole surface of adhesive. In addition, the adhesive may be double-sided tape, an OCA, or the like. Specifically, selection may be performed according to an actual situation, and no specific limitation is imposed herein. For a specific attaching manner, refer to FIG. 2A and FIG. 2B, and details are not described herein.

At least one gap (for example, a blank area between a lower surface of the display module and the conducting layer) exists between the conducting layer 504 and a lower surface 52 of the display module 502. The lower surface 52 of the display module 502 is a metal material, and the lower surface 52 of the display module 502 is grounded. The conducting layer 504, the lower surface 52 of the display module 502, and the at least one gap form at least one capacitor. That is, the conducting layer is considered as one panel of the capacitor, and the lower surface of the display module is considered as the other panel of the capacitor. A change of the at least one capacitor reflects a magnitude of at least one pressure acted on the cover 501.

The conducting layer 504 is an ITO film or a copper foil FPC.

In this embodiment of the present disclosure, a conducting layer and a lower surface of a display module are insulated from each other, and in addition, a specific gap exists between the conducting layer and the lower surface of the display module, and a depth of the gap is generally about 0.2 mm. Therefore, at least one capacitor may be formed by using the conducting layer, the lower surface of the display module, and at least one gap between the conducting layer and the lower surface of the display module. That is, the conducting layer is considered as one panel of the capacitor, and the lower surface of the display module is considered as the other panel of the capacitor. Further, a magnitude of at least one pressure acted on a cover may be reflected by a capacitance change of the at least one capacitor. For example, when a user uses a finger to press a touchscreen cover of a terminal, the user imposes a specific pressure on the touchscreen cover, and the conducting layer deforms because of action of the force. As a result, a distance between the two panels of the capacitor changes, and consequently, a capacitance of the capacitor changes. A capacitance change of the capacitor may reflect the magnitude of the at least one pressure acted on the cover. Further, the terminal may receive a signal of the capacitance change of the capacitor, and therefore perform a corresponding operation, for example, turn up or turn down volume of the terminal.

Different from the prior art, a conducting material needed for the conducting layer is in existence, and no dedicated pressure material is needed. Therefore, the pressure touch control may be implemented without a need of developing a new provider for resource integration, thereby reducing integration costs.

Figure 16:
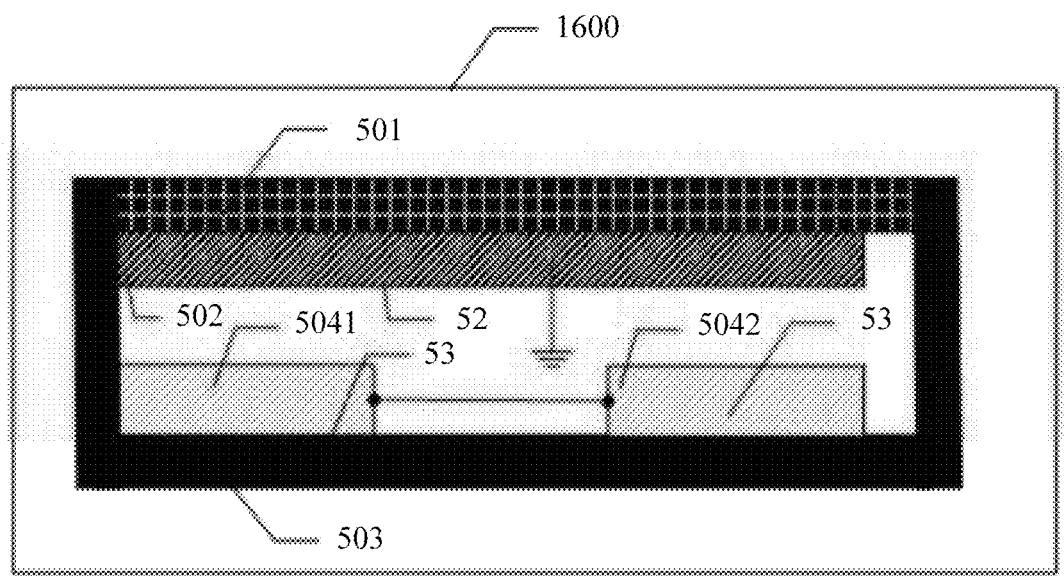
FIG. 16 is another schematic structural diagram of a terminal according to an embodiment of the present disclosure.

On the basis of the embodiment shown in FIG. 15, refer to FIG. 16. FIG. 16 is a schematic structural diagram of a terminal 1600. The conducting layer 504 includes at least a first conducting block 5041 and a second conducting block 5042, where the first conducting block 5041 is connected to the second conducting block 5042.

It may be understood that, after the first conducting block is connected to the second conducting block, circuit connection is implemented between the first conducting block and the second conducting block. Therefore, the first conducting block and the second conducting block may share a power supply module of the terminal. For example, after the first conducting block obtains electric energy from the power supply module of the terminal, the second conducting block may directly obtain electric energy from the first conducting block without a need of connecting to a circuit of the power supply module of the terminal, thereby reducing space required for circuit arrangement.

Different from the prior art, the conducting layer is divided into different conducting blocks, and a mode between the conducting blocks may be a self-capacitance mode, or may be a mutual capacitance mode. The terminal may identify a position point that is on a conducting block and that is corresponding to a position point of pressure acted on the cover.

The first conducting block 5041 and the second conducting block 5042 each are attached to the upper surface 53 of the middle frame 503.

A first gap (for example, a gap between the first conducting block and the lower surface of the display module in FIG. 16) exists between the first conducting block 5041 and the lower surface 52 of the display module 502. The first conducting block 5041, the lower surface 52 of the display module 502, and the first gap form a first capacitor. That is, the first conducting block is considered as one panel of the first capacitor, and the lower surface of the display module is considered as the other panel of the first capacitor. A second gap (for example, a gap between the second conducting block and the lower surface of the display module in FIG. 16) exists between the second conducting block 5042 and the lower surface of the display module 502. The second conducting block 5042, the lower surface 52 of the display module 502, and the second gap form a second capacitor. That is, the second conducting block is considered as one panel of the second capacitor, and the lower surface of the display module is considered as the other panel of the second capacitor. Capacitance changes of the first capacitor and the second capacitor reflect a magnitude of a first pressure acted on the cover 501.

In this embodiment of the present disclosure, a first conducting block, a lower surface of a display module, and a first gap form a first capacitor, and a second conducting block, the lower surface of the display module, and a second gap form a second capacitor. Because the first conducting block is connected to the second conducting block, capacitance changes of the first capacitor and the second capacitor reflect a magnitude of a first pressure acted on a cover. For example, when a single finger presses a touchscreen cover, a pressure imposed by the single finger may cause capacitances of the first capacitor and the second capacitor to change. Therefore, the capacitance changes of the first capacitor and the second capacitor may reflect a magnitude of the pressure that is generated by the pressing by the single finger and that is acted on the touchscreen cover.

Figure 17:
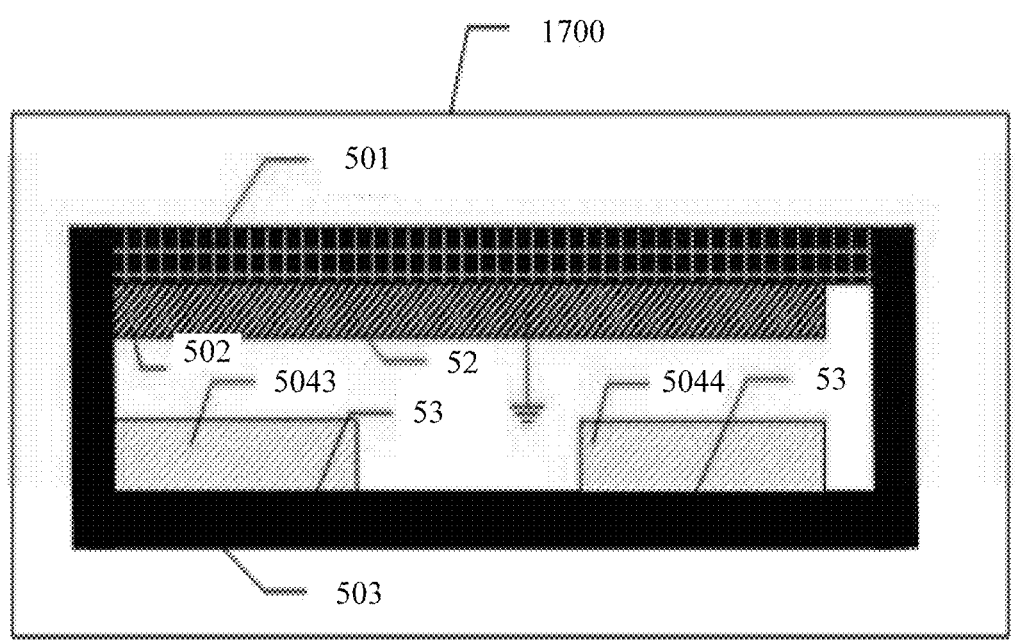
FIG. 17 is another schematic structural diagram of a terminal according to an embodiment of the present disclosure.

On the basis of the embodiment shown in FIG. 15, refer to FIG. 17. FIG. 17 is a schematic structural diagram of a terminal 1700. The conducting layer 504 includes at least a third conducting block 5043 and a fourth conducting block 5044, where the third conducting block 5043 is not connected to the fourth conducting block 5044.

Different from the prior art, the conducting layer is divided into different conducting blocks, and a mode between the conducting blocks may be a self-capacitance mode, or may be a mutual capacitance mode. The terminal may identify a position point that is on a conducting block and that is corresponding to a position point of pressure acted on the cover. In addition, the force acted on the cover causes deformation of the entire conducting layer, and deformation degrees of all position points on the conducting layer are also different. Therefore, capacitance changes of different capacitors may be sensed.

It should be noted that, a material of the conducting layer is an ITO film or an FPC, and certainly, may also be another conducting material. No specific limitation is imposed herein.

The third conducting block 5043 and the fourth conducting block 5044 each are attached to the upper surface 53 of the middle frame 503.

A third gap (for example, a gap between the third conducting block and the lower surface of the display module in FIG. 17) exists between the third conducting block 5043 and the lower surface 52 of the display module 502. The third conducting block 5043, the lower surface 52 of the display module 502, and the third gap form a third capacitor. That is, the third conducting block is considered as one panel of the third capacitor, and the lower surface of the display module is considered as the other panel of the third capacitor. A capacitance change of the third capacitor reflects a magnitude of a second pressure acted on the cover 501.

A fourth gap (for example, a gap between the first conducting block and the lower surface of the display module in FIG. 17) exists between the fourth conducting block 5044 and the lower surface 52 of the display module 502. The fourth conducting block 5044, the lower surface of the display module 502, and the fourth gap form a fourth capacitor. That is, the fourth conducting block is considered as one panel of the fourth capacitor, and the lower surface of the display module is considered as the other panel of the fourth capacitor. A capacitance change of the fourth capacitor reflects a magnitude of a third pressure acted on the cover 501.

In this embodiment of the present disclosure, a third conducting block, a lower surface of a display module, and a third gap form a third capacitor, and a fourth conducting block, the lower surface of the display module, and a fourth gap form a fourth capacitor. Because the third conducting block is not connected to the fourth conducting block, a capacitance change of the third capacitor reflects a magnitude of a second pressure acted on a cover, and a capacitance change of the fourth capacitor reflects a magnitude of a third pressure acted on the cover. For example, when two fingers press a touchscreen cover, a first finger of the two fingers acts on a first area, of the cover, corresponding to the first conducting block, and a second finger of the two fingers acts on a second area, of the cover, corresponding to the second conducting block. A pressure generated by the first finger causes a capacitance of the third capacitor to change, and a pressure generated by the second finger causes a capacitance of the fourth capacitor to change. Therefore, a capacitance change of the third capacitor may reflect a magnitude of the pressure that is generated by the pressing by one of the two fingers and that is acted on the touchscreen cover, and a capacitance change of the fourth capacitor may reflect a magnitude of the pressure that is generated by the pressing by the other finger of the two fingers and that is acted on the touchscreen cover. It can be seen that, the first conducting block is not connected to the second conducting block, so that multi-finger touch control may be implemented, thereby effectively improving user experience.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing describes in detail a data transmission method and a related device that are provided in the present disclosure. Specific examples are used in this specification to describe the principle and implementations of the present disclosure. The foregoing embodiments are merely intended to help understand the method and idea of the present disclosure. In addition, with respect to the implementations and the application scope, modifications may be made by a person of ordinary skill in the art according to the idea of the present disclosure. Therefore, the specification shall not be construed as a limitation on the present disclosure.

What is claimed is:

1. A terminal, comprising:
   a cover;
   a display coupled to the cover, wherein the cover is located above the display, wherein the display comprises a backlight, a thin film transistor (TFT) substrate and a TFT circuit, wherein the TFT substrate is located between the backlight and the TFT circuit, and wherein the TFT circuit comprises a constant voltage layer;
   a conducting layer attached to a lower surface of the backlight; and
   a dielectric between the conducting layer and the constant voltage layer of the TFT circuit, wherein the dielectric comprises the TFT substrate, wherein the conducting layer, the constant voltage layer of the TFT circuit, and the dielectric form at least one capacitor, and wherein a capacitance change of the at least one capacitor reflects a magnitude of at least one pressure acted on the cover.

2. The terminal of claim 1, wherein the conducting layer comprises at least a first conducting block and a second conducting block, wherein the first conducting block is connected to the second conducting block, wherein the first conducting block and the second conducting block are attached to the lower surface of the backlight, wherein the dielectric includes a first dielectric and a second dielectric, wherein the first dielectric is between the first conducting block and the constant voltage layer of the TFT circuit, wherein the first conducting block, the constant voltage layer of the TFT circuit, and the first dielectric form a first capacitor, wherein the second dielectric is between the second conducting block and the constant voltage layer of the TFT circuit, wherein the second conducting block, the constant voltage layer of the TFT circuit, and the second dielectric form a second capacitor, and wherein capacitance changes of the first capacitor and the second capacitor reflect a magnitude of a first pressure acted on the cover.

3. The terminal of claim 1, wherein the conducting layer comprises at least a third conducting block and a fourth conducting block, wherein the third conducting block is not connected to the fourth conducting block, wherein the third conducting block and the fourth conducting block each are attached to the lower surface of the backlight, wherein the dielectric includes a third dielectric and a fourth dielectric, wherein the third dielectric is between the third conducting block and the constant voltage layer of the TFT circuit, wherein the third conducting block, the constant voltage layer of the TFT circuit, and the third dielectric form a third capacitor, wherein a capacitance change of the third capacitor reflects a magnitude of a second pressure acted on the cover, wherein the fourth dielectric is between the fourth conducting block and the constant voltage layer of the TFT circuit, wherein the fourth conducting block, the constant voltage layer of the TFT circuit, and the fourth dielectric form a fourth capacitor, and wherein a capacitance change of the fourth capacitor reflects a magnitude of a third pressure acted on the cover.

4. The terminal of claim 1, wherein the terminal further comprises:
a metal middle frame located below the conducting layer; and
at least one elastic adhesive adhered to a lower surface of the conducting layer or an upper surface of the metal middle frame.

5. The terminal of claim 1, wherein the conducting layer is an indium tin oxide (ITO) film or a copper foil flexible printed circuit (FPC).

* * * * *